United States Patent
De With et al.

(10) Patent No.: US 6,798,836 B1
(45) Date of Patent: Sep. 28, 2004

(54) DEVICE FOR TRANSMITTING TELEVISION PICTURES AND DEVICE FOR RECEIVING SAID PICTURES

(75) Inventors: Peter H. N. De With, Eindhoven (NL); Stephanus J. J. Nijssen, Eindhoven (NL)

(73) Assignee: Koninklijke Philips Electronis N.V., Eindhoven (NL)

(*) Notice: Subject to any disclaimer, the term of this patent is extended or adjusted under 35 U.S.C. 154(b) by 1007 days.

(21) Appl. No.: 09/328,693

(22) Filed: Oct. 14, 1997

Related U.S. Application Data

(63) Continuation of application No. 08/816,465, filed on Mar. 13, 1997, now abandoned, which is a continuation of application No. 08/330,060, filed on Oct. 27, 1994, now abandoned.

(30) Foreign Application Priority Data

Oct. 29, 1993 (BE) .......................................... 09301182

(51) Int. Cl.$^7$ ............................... H04N 7/12; G06K 9/36
(52) U.S. Cl. ............................... 375/240.16; 348/420.1; 382/236
(58) Field of Search ..................... 375/240.16, 240.24, 375/240.23; 348/413.1, 416.1, 409.1, 415.1, 420.1, 401.1–403.1, 699; 382/236

(56) References Cited

U.S. PATENT DOCUMENTS

| | | | |
|---|---|---|---|
| 4,901,075 A | | 2/1990 | Vogel .......................... 341/63 |
| 5,247,355 A | * | 9/1993 | Frederiksen ................. 348/416 |
| 5,349,384 A | * | 9/1994 | Oguro ......................... 358/335 |
| 5,428,396 A | * | 6/1995 | Yagasaki et al. ........ 375/240.16 |
| 5,473,379 A | * | 12/1995 | Horne ......................... 348/413 |

FOREIGN PATENT DOCUMENTS

| | | |
|---|---|---|
| EP | 0260748 | 3/1988 |
| EP | 0419752 | 4/1991 |
| EP | 0556507 | 8/1993 |

OTHER PUBLICATIONS

"Digitale Bildcodierung, Bewegungskompensietre, Interframe–DPCM" FKT Jun. 1992 p. 416–424.

* cited by examiner

*Primary Examiner*—Gims Philippe

(57) ABSTRACT

Device for transmitting television pictures in the form of transform coefficients and motion vectors. The motion vectors of a sub-picture are converted (20) into a series of difference vectors and a reference vector. The series is subsequently applied to a variable-length encoder (22) which encodes a run of zero values and a subsequent non-zero value into a code word of variable length. The variable-length encoder may be the same as the encoder which encodes the coefficients.

8 Claims, 3 Drawing Sheets

DEVICE FOR TRANSMITTING TELEVISION PICTURES AND DEVICE FOR RECEIVING SAID PICTURES

This is a continuation of application Ser. No. 08/816,465, filed on Mar. 13, 1997 now abandoned which is a continuation of prior application Ser. No. 08/330,060, filed on Oct. 27, 1994, now abandoned.

FIELD OF THE INVENTION

The invention relates to a device for transmitting television pictures and to a device for receiving television pictures thus transmitted. Both devices may be combined in one apparatus, constituting a video recorder. The invention also relates to a storage medium on which television pictures are stored.

DESCRIPTION OF THE PRIOR ART

A device for transmitting television pictures of the type described in the opening paragraph is known from European Patent Application EP 0 419 752. The known device comprises means for dividing each television picture into blocks, means for forming a motion vector for selected blocks, means for forming a reference vector and a plurality of difference vector from the motion vectors of a plurality of contiguous blocks which constitute a sub-picture, and a variable-length encoder for encoding the difference vectors into code words of variable length.

In the known device the reference vector is constituted by the mean value of the motion vectors of the sub-picture. The reference vector is transmitted as a code word of fixed length. The difference vectors are transmitted as code words of variable length. With this, a certain extent of encoding efficiency and protection from channel errors is aimed at.

OBJECT AND SUMMARY OF THE INVENTION

It is an object of the invention to further improve the encoding efficiency of the device.

According to the invention the device is therefore characterized in that the motion vectors of a sub-picture are applied to the variable-length encoder in the form of a series which successively comprises the difference vectors and the reference vector, the variable-length encoder being of a type which allocates a code word of variable length to a series of zero values and a subsequent non-zero value.

The invention is based on the recognition that moving objects in a picture are generally larger than one block. This means that the blocks of a sub-picture generally comprise the same quantity of motion. The difference vectors then have a value of zero, whereas the reference vector is often unequal to zero. By presenting such a series of zero values and a subsequent non-zero value to the variable-length encoder, it will often compress the motion information of a sub-picture to one code word only.

The reference vector is preferably constituted by the motion vector of a selected block of the sub-picture. It is then no longer necessary to transmit a difference vector for this block so that the encoding efficiency further increases. The difference vectors are preferably formed from the motion vectors of contiguous blocks. The difference in motion of a block with a contiguous block is smaller than with a more remote reference block because contiguous blocks generally have a larger extent of corresponding motion. The difference vectors thus more frequently have the value of zero and are then encoded more efficiently.

In a preferred embodiment of the device the variable-length encoder is constituted by the variable-length encoder for encoding coefficients which are obtained from picture transform of a block. A separate variable-length encoder can thus be dispensed with. Moreover, it has been found that the series of applied motion vectors statistically corresponds satisfactorily to the distribution of coefficients within a block in which series of zero coefficients are often followed by a non-zero coefficient. The encoding efficiency is thus even further improved.

A corresponding device for receiving television pictures is characterized in that it comprises a variable-length decoder of a type which decodes a code word of variable length into a series of zero values and a subsequent non-zero value. In a preferred embodiment the variable-length decoder is constituted by the variable-length decoder which is already present for decoding the coefficients.

DESCRIPTION OF EMBODIMENTS

Figure 1:
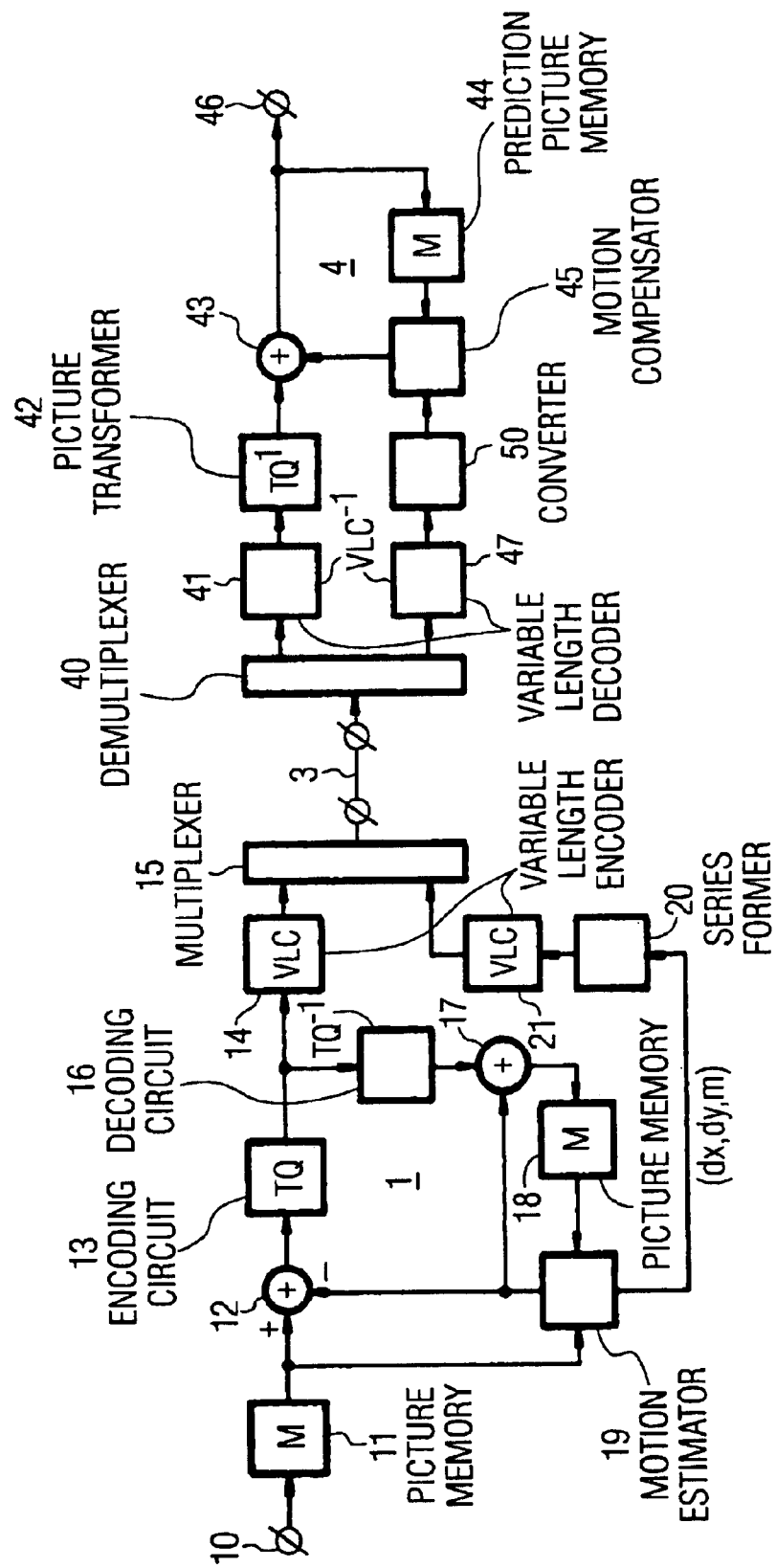
FIG. 1 shows diagrammatically a transmission system comprising a device for transmitting and receiving television pictures according to the invention.

FIG. 1 shows diagrammatically a television transmission system according to the invention. The system comprises a device 1 for transmitting television pictures (hereinafter referred to as transmitter), a transmission channel 3 and a device 4 for receiving the transmitted television pictures (hereinafter referred to as receiver). In practice, the transmission system shown may be a video recorder. In that case transmission channel 3 is constituted as a storage medium.

An input 10 of transmitter 1 receives a digital video signal. The received pictures are stored in a first picture memory 11 and applied in blocks from this memory to a subtracter circuit 12. In the subtracter circuit a motion-compensated prediction picture is subtracted from the current picture. The difference picture is encoded in an encoding circuit 13 which performs, for example a Discrete Cosine Transform and quantizes the coefficients obtained therefrom. The quantized coefficients are then subjected to variable-length encoding in a variable-length encoder 14. The code words thus obtained are transmitted via a multiplexer 15. A prediction loop in the transmitter comprises a decoding circuit 16 which performs the inverse operations of encoding circuit 13. The difference picture is thereby regained and added in an adder circuit 17 to the current prediction picture in order to form the next prediction picture in a second picture memory 18. A motion estimator 19 receives the current picture from picture memory 11 and the prediction picture from picture memory 18 and supplies the motion-compensated prediction picture to the subtracter circuit 12. Moreover, the motion estimator supplies motion vectors (dx,dy) for transmission to a receiver. The transmitter as described up to this point is generally known and described, for example in "Digitale Bildcodierung, Bewegungskompensierte Interframe-DPCM", FKT 6/1992, pp. 416–424.

In accordance with the invention, the transmitter further comprises a series former 20 to which the motion vectors (dx,dy) are applied and which will be further described. The series former forms a series of difference vectors and a reference vector for a plurality of blocks of the television picture and applies these vectors to a second variable-length encoder 21. The two variable-length encoders 14 and 21 are coupled to the multiplexer 15 in order that this multiplexer applies both the code words which are representative of coefficients and the code words which are representative of motion vectors to transmission channel 3.

Figure 2:
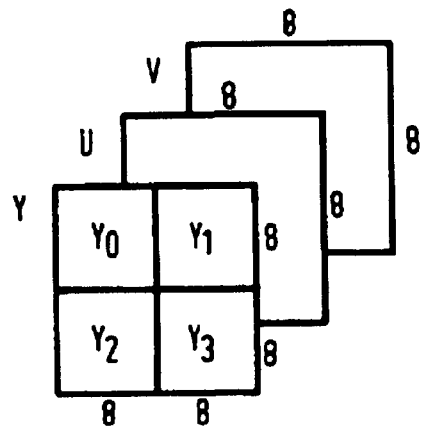
FIG. 2 shows a possible choice of a sub-picture to explain the invention.

In practice, the picture transformer encoder 13 and motion estimator 19 operate on picture blocks of, for example 8*8 pixels. The picture transform is separately realised for the luminance Y and the chrominance U and V components of the television signal. If the sample frequency of the chrominance signals in the horizontal and vertical direction is half the sample frequency of the luminance signal, one chrominance block U and one chrominance block V is obtained for four luminance blocks Y. This is customarily referred to as a macro block. Such a macro block forms a sub-picture and is shown symbolically in FIG. 2. Other manners of forming a sub-picture from a plurality of contiguous blocks are, however, alternatively possible.

The motion estimation is performed for each of the luminance blocks. A separate motion estimation for the chrominance blocks may be refrained from because it may be assumed that they are subject to the same motion as the Y blocks. For each macro block $Y_0, Y_1, Y_2, Y_3$ (see FIG. 2) a motion vector $(dx_i, dy_i)$ is formed by the motion estimator 19 (see FIG. 1), in which $dx_i$ and $dy_i$ (i=0 . . . 3) represent the horizontal and vertical shift of a block with respect to the corresponding block in the prediction picture.

Figure 3:
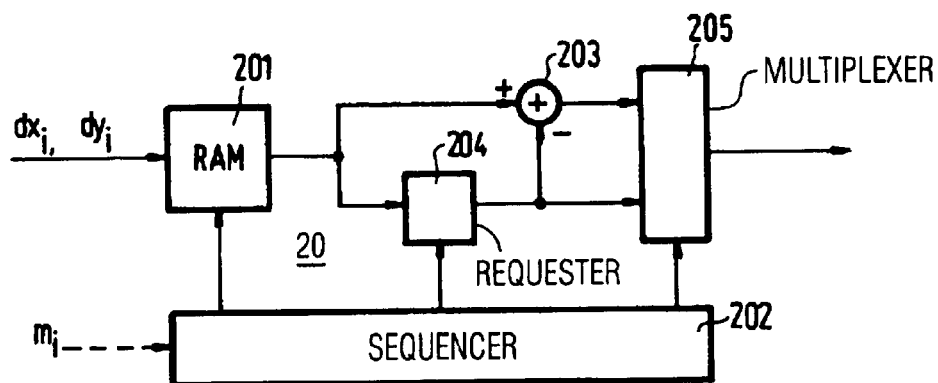
FIG. 3 shows a possible embodiment of the series former included in FIG. 1.

FIG. 3 shows a possible embodiment of the series former 20 shown in FIG. 1. It comprises a RAM 201 in which the motion vectors $(dx_i, dy_i)$ are stored at predetermined locations by the motion estimator. The RAM is read under the control of a sequencer 202. The values read are applied to a first input of a subtracter circuit 203. Moreover the values read can be stored in a register 204 in response to a clock signal generated by the sequencer. The second input of the subtracter circuit 203 is coupled to the output of register 204. Again under the control of the sequencer, either the output of the subtracter circuit or the output of the register is selected via a multiplexer 205 for supply to the variable-length encoder 21 (see FIG. 1).

The operation of the series former 20 is further based on instructions stored in the sequencer. In a first embodiment the sequencer carries out the following instructions:

1. store $dx_2$ in the register
2. apply $dx_3$ to the subtracter circuit
3. select the subtracter circuit, i.e. $dx_3-dx_2$
4. store $dx_0$ in the register
5. apply $dx_2$ to the subtracter circuit
6. select the subtracter circuit, i.e. $dx_2-dx_0$
7. apply $dx_1$ to the subtracter circuit
8. select the subtracter circuit, i.e. $dx_1-dx_0$
9. select the register, i.e. $dx_0$ In this way the series former forms a series of numbers:

$$\{dx_3-dx_2, dx_2-dx_0, dx_1-dx_0, dx_0\},$$

In other words, a series of difference vectors followed by a reference vector which is formed by $dx_0$ in this case. In a corresponding manner a series of numbers $$\{dy_3-dy_2, dy_2-dy_0, dy_1-dy_0, dy_0\},$$

is subsequently formed for the vertical component of the motion vectors. In this second series of numbers, the reference vector is formed by $dy_0$.

The two series of numbers are applied to the variable-length encoder 21 (see FIG. 1). This encoder is of a type which allocates a code word of variable length to each sequence of zero values and followed by a non-zero value. A favourable embodiment of such an encoder is described extensively in European Patent Application EP 0 260 748 which corresponds to U.S. Pat. No. 4,901,075, issued Sep. 11, 1987, assigned to the present assignee. If the difference vectors have the value of zero, the encoder supplies only one code word for each series of numbers. In practice, this frequently occurs so that the motion vectors of the sub-picture are encoded efficiently.

A second embodiment of the sequencer is adapted to generate the following series of numbers:

$$\{dy_3-dy_2, dy_2-dy_0, dy_1-dy_0, dx_3-dx_2, dx_2-dx_0, dx_1-dx_0, dy_0, dx_0\}$$

This series starts with the difference vectors in the vertical direction. These difference vectors often have the value of zero because the picture (particularly a 16:9 picture) is smaller in the vertical direction than in the horizontal direction. The relatively long series of numbers therefore often, starts with many zero values. This contributes to the efficiency of the variable-length encoding. Moreover, much motion is caused by horizontal panning of the television camera. In that case the long series of numbers yields only one code word.

As is apparent from the series of numbers, the difference is determined by A means of the motion vector of the adjoining block $Y_2$ for block $Y_3$ in both embodiments. This is more favourable than subtraction from the reference vector (as is done in the known device) because the reference vector is the motion vector of a block which is further remote (here $Y_0$) whose motion is less frequently equal. Determination of the difference between the motion vector of block $Y_3$ and that of block $Y_1$ would also be a suitable choice. It is even sensible to make a different choice for the horizontal component of the motion vector than for the vertical component.

A corresponding device for receiving the television pictures will now be described. In FIG. 1, the receiver 4 comprises a demultiplexer 40 by means of which the channel bit stream is split into encoded coefficients and encoded motion vectors. The receiver further comprises in known manner a variable-length decoder 41 for decoding the coefficients, an inverse quantizer and picture transformer 42, an adder circuit 43 for reconstructing the received picture, a prediction picture memory 44 and a motion compensator 45. The reconstructed picture is applied to an output 46. Variable-length decoder 41 performs the inverse operation of encoder 14.

In accordance with the invention, the encoded motion vectors are applied to a second variable-length decoder 47. This decoder performs the inverse operation of encoder 21 so that the series of numbers are obtained which are representative of the motion vectors. The series of numbers are subsequently converted by a converter 50 into the individual motion vectors (dx,dy) by means of which the motion compensator 45 reconstructs the blocks of the prediction picture.

Figure 4:
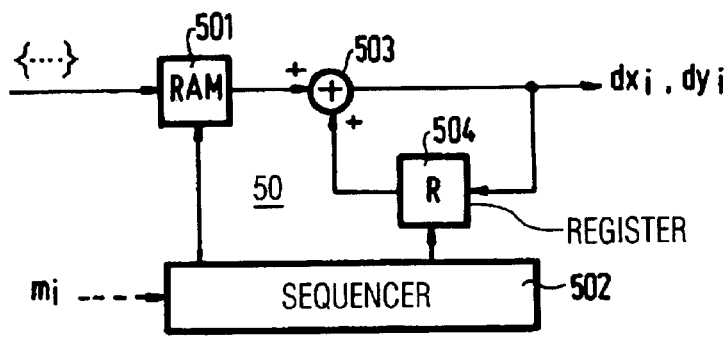
FIG. 4 shows a possible embodiment of the converter included in FIG. 1.

FIG. 4 shows a possible embodiment of the converter 50 shown in FIG. 1. It comprises a RAM 501 in which the decoded series of numbers is stored upon reception. The RAM is read under the control of a sequencer 502. The values which have been read are applied to a first input of an adder circuit 503. Its output is fed back via a register 504 to the second input of the adder circuit. The register receives clock and reset signals from the sequencer 502.

The operation of the converter 50 is further based on instructions which are stored in the sequencer. The converter performs the inverse operations of series former 20 in the transmitter (see FIG. 3). To this end, the sequencer carries out the following instructions in a first embodiment:

1. reset the register
2. read $dx_0$ from RAM, Output signal is $dx_0$
3. clock output signal in the register
4. read $dx_1-dx_0$ from RAM, output signal is $dx_1$
5. read $dx_2-dx_0$ from RAM, Output signal is $dx_2$
6. clock output signal in the register
7. read $dx_3-dx_2$ from RAM, output signal is $dx_3$ In this way the horizontal components $dx_i$ of the motion vectors of the sub-picture are regained. In a corresponding manner, the vertical components $dy_1$ are subsequently obtained. A second embodiment of the sequencer (for regaining the motion vectors from the previously described "long" series of numbers) can be derived by those skilled in the art from the foregoing explanation.

In some cases the motion within a picture is distributed in such a way that it is more favourable to subject given blocks to intraframe coding. In this way the situation may arise that one or more blocks of a sub-picture are transmitted in themselves (i.e. without motion vectors), whereas other blocks of the same sub-picture are subjected to motion compensated interframe coding. Such a strategy is used, inter alia in the known MPEG standard. A mode bit is generated by the motion estimator 19 (see FIG. 1) and transmitted so as to indicate the encoding mode used for each block.

Figures 5A, 5B:
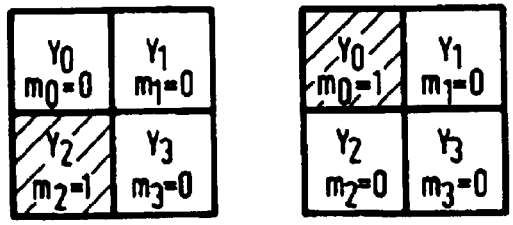
FIGS. 5A and 5B show some sub-pictures to explain the operation of the series formers should in FIG. 3.

In a corresponding embodiment of the series former 20 (see FIG. 3) the sequencer 202 is adapted to produce the series of numbers in dependence upon the encoding mode. As is shown in a broken line in FIG. 3, the sequencer now receives the mode bits mi (i =0 . . . 3) which correspond to the blocks $Y_0 \ldots Y_3$. By means of the value 1, the mode bit indicates that a block is subjected to intraframe coding and the value 0 indicates that it is subjected to interframe coding. To explain the operation of the sequencer, FIGS. 5A and 5B show two examples of macro blocks, one block of which is subjected to intraframe coding. In FIG. 5A, the shaded block $Y_2$ represents an intraframe-coded block. In this case the sequencer forms the series of numbers:

$\{dx_3-dx_1, dx_1-dx_0, dx_0\}$ and $\{dy_3-dy_1, dy_1-dy_0, dy_0\}$

In FIG. 5B, $Y_0$ is the intraframe-coded block. Since no motion vectors are generated for this block, the motion vectors of the next interframe block (here $Y_1$) form the reference vector. The sequencer now forms the series of numbers:

$\{dx_3-dx_2, dx_3-dx_1, dx_1\}$ and $\{dy_3-dy_2, dy_3-dy_1, dy_1\}$

The sequencer 502 (see FIG. 4) in the receiver performs the inverse operations for regaining the motion vectors. Embodiments of the two sequencers can be simply derived by those skilled in the art from the previous explanation.

Figure 6:
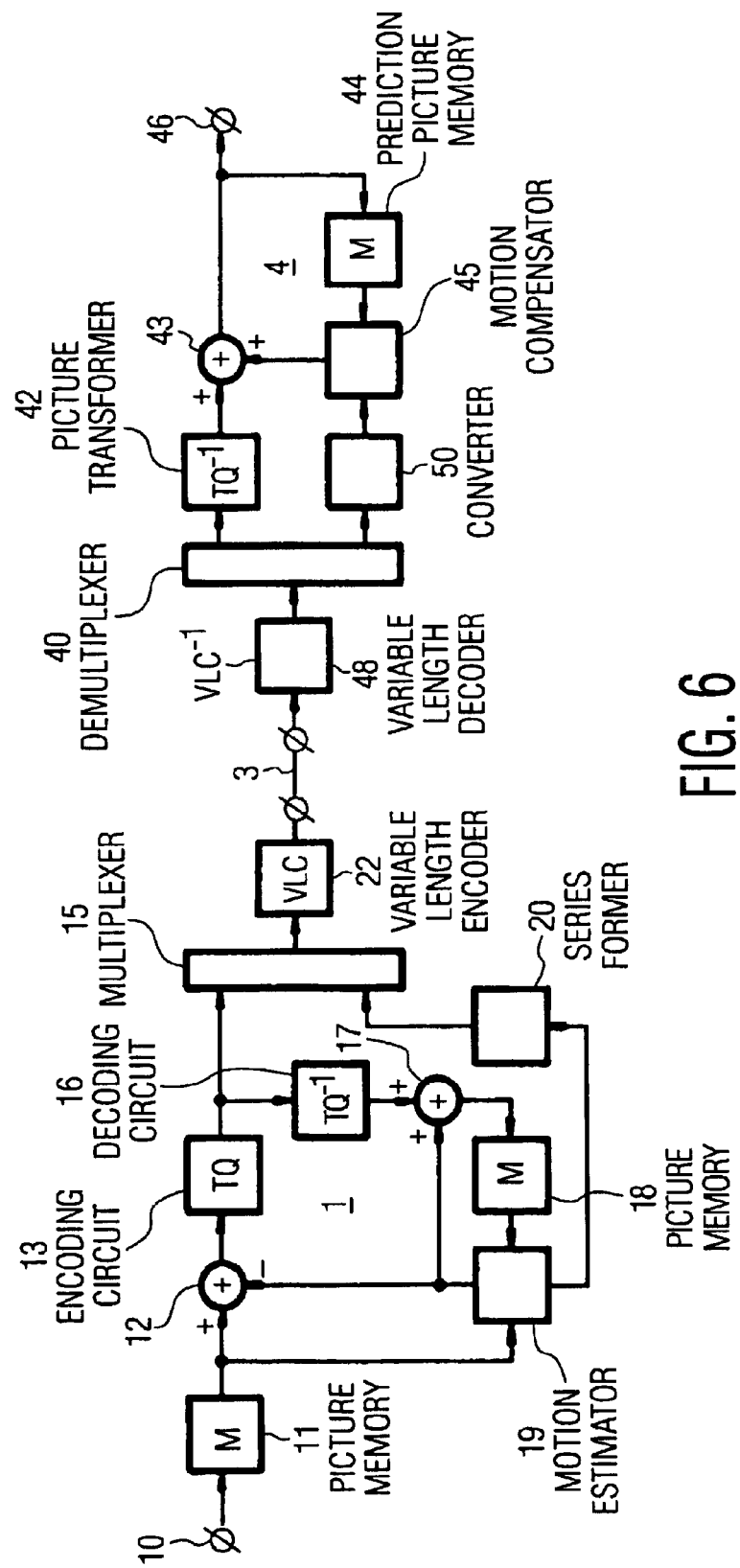
FIG. 6 shows a further embodiment of a transmission system comprising a device for transmitting and receiving television pictures.

FIG. 6 shows a further embodiment of a transmission system comprising a transmitter and a receiver according to the invention. Identical reference numerals refer to the same elements as in FIG. 1. The system is distinguished from the system shown in FIG. 1 in that the transmitter 1 comprises a variable-length encoder 22 for encoding coefficients as well as motion stators. To this end, the multiplexer 15 is arranged in front of said encoder. The variable-length encoder is of the type which allocates a code word of variable length to a series of zero values and a subsequent non-zero value. In a corresponding manner, the receiver 4 comprises one variable-length decoder 48 and, arranged behind it, the demultiplexer 40 for splitting coefficients and motion vectors. The embodiment shown in FIG. 6 is both economical and efficient. On the one hand, a variable-length (de)coder is saved in each transmitter and receiver. On the other hand, it has been found that the series of numbers representing motion vectors are statistically satisfactorily suitable for the series of coefficients to which relatively short code words are allocated.

The devices according to the invention may also be used in encoding systems in which only one motion vector per macro block is generated. This is, for example the case in the MPEG standard. In this case a sub-picture can be formed across a plurality of contiguous macro blocks. The series of numbers for supply to the variable-length encoder is then formed in the manner already described from the corresponding plurality of motion vectors.

It should finally be noted that the same reference vector whose value is derived from the pan and tilt movements of the television camera supplying the television pictures can be transmitted for the entire picture.

What is claimed is:

1. A device for transmitting television pictures, comprising:

means for dividing each television picture into blocks;

means for forming motion vectors for said blocks;

means for forming a reference vector and a plurality of difference vectors from the motion vectors of a plurality of contiguous blocks which form a sub-picture, the reference vector being the motion vector of any selected one of said blocks, and each difference vector being the difference between the motion vector of block and the motion vector an immediately adjacent block; and a variable-length encoder for encoding the difference vectors into code words of variable length, the motion vectors of a sub-picture being applied to the variable-length encoder in the form of a series which successively comprises the difference vectors and the reference vector, the variable-length encoder being of a type which allocates a code word of variable length to each sequence of zero values followed by a non-zero value in said series.

2. A device as claimed in claim 1, wherein the blocks of the sub-picture are subjected to either an intraframe encoding mode or an interframe encoding mode, in which the difference vectors and/or the reference vector are formed from the motion vectors of the blocks subjected to the interframe encoding mode.

3. A device as claimed in claim 1 further comprising a picture transformer for transforming each block into coefficients and a variable-length encoder for encoding the coefficients, wherein the variable-length encoder for encoding the difference vectors is constituted by the variable-length encoder for encoding the coefficients.

4. A device for receiving television pictures, comprising:

a variable-length decoder for decoding received code words of variable length into difference vectors;

means for forming, from the difference vectors and a reference vector, motion vectors of a plurality of contiguous blocks which form a sub-picture, the reference vector being the motion vector of any selected one of said blocks, and each difference vector being the difference between the motion vector of a block and the motion vector an immediately adjacent block; and means for regaining the television picture from the sub-picture blocks and the corresponding motion vectors, the variable-length decoder being of a type which decodes each variable length code word into a series of zero values followed by a non-zero value.

5. A device as claimed in claim 4, wherein the motion vectors are formed from the series of difference vectors and/or the reference vector in dependence upon a received encoding mode which indicates for the blocks of the sub-picture whether these blocks are subjected to either an intraframe encoding mode or an interframe encoding mode.

6. A device as claimed in claim 4, further comprising a variable-length decoder for decoding received code words of variable length to recover coefficients of said sub-picture blocks, and a picture transformer for transforming the coefficients of said blocks, the variable-length decoder for decoding the motion vectors being constituted by the variable-length decoder for decoding said coefficients.

7. A video recorder for recording television pictures on a storage medium, comprising:

means for dividing each television picture into blocks;

means for forming motion vectors for said blocks;

means for forming a reference vector and a plurality of difference vectors from the motion vectors of a plurality of contiguous blocks which form a sub-picture, the reference vector being the motion vector of any selected one of said blocks, and each difference vector being the difference between the motion vector of a block and the motion vector an immediately adjacent block; and a variable-length encoder for encoding the difference vectors into code words of variable length, the motion vectors of a sub-picture being applied to the variable-length encoder in the form of a series which successively comprises the difference vectors and the reference vector, the variable-length encoder being of a type which allocates a code word of variable length to each sequence of zero values followed by a non-zero value in said series.

8. A signal for carrying television pictures, comprising:

television pictures in the form of code words which are representative of motion vectors, wherein the motion vectors of a sub-picture are a series of difference vectors and a reference vector, a series of zero values and a subsequent non-zero value being encoded as a code word of variable length, and wherein the reference vector is the motion vector of any selected one of said blocks, and each difference vector being the difference between the motion vector of a block and the motion vector an immediately adjacent block.

* * * * *